(12) United States Patent
Delvaux

(10) Patent No.: US 9,267,378 B2
(45) Date of Patent: Feb. 23, 2016

(54) TURBOMACHINE MONITORING SYSTEM AND METHOD

(75) Inventor: John McConnell Delvaux, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 13/535,319

(22) Filed: Jun. 27, 2012

(65) Prior Publication Data

US 2014/0003905 A1 Jan. 2, 2014

(51) Int. Cl.
| | | |
|---|---|---|
| *F01D 5/28* | (2006.01) | |
| *F01D 21/00* | (2006.01) | |
| *G01B 15/06* | (2006.01) | |
| *F01D 5/00* | (2006.01) | |

(52) U.S. Cl.
CPC ........ *F01D 5/005* (2013.01); *F01D 5/28* (2013.01); *F01D 21/003* (2013.01); *G01B 15/06* (2013.01); *F05D 2260/80* (2013.01); *Y02T 50/672* (2013.01)

(58) Field of Classification Search
None
See application file for complete search history.

(56) References Cited

U.S. PATENT DOCUMENTS

| | | | |
|---|---|---|---|
| 4,873,414 A * | 10/1989 | Ma et al. ................. 219/121.7 |
| 4,914,953 A * | 4/1990 | Viscovich ...................... 73/660 |
| 5,097,711 A * | 3/1992 | Rozelle et al. ................... 73/660 |
| 5,511,426 A | 4/1996 | Clement et al. |
| 6,710,328 B1 | 3/2004 | Mastro et al. |
| 7,341,428 B2 * | 3/2008 | Twerdochlib ..................... 416/1 |
| 7,507,466 B2 * | 3/2009 | Steibel et al. ............... 428/293.4 |
| 7,534,086 B2 * | 5/2009 | Mazzola et al. ........... 415/173.1 |
| 7,707,889 B2 * | 5/2010 | Maurus et al. ................... 73/660 |
| 8,126,662 B2 * | 2/2012 | Twerdochlib ................... 702/56 |
| 8,151,647 B2 * | 4/2012 | Twerdochlib ................... 73/661 |
| 2002/0148300 A1 | 10/2002 | Goods et al. |
| 2004/0101023 A1 * | 5/2004 | Choi ............................. 374/141 |
| 2009/0122832 A1 * | 5/2009 | Feist et al. ..................... 374/161 |
| 2010/0282117 A1 | 11/2010 | Cranor et al. |
| 2011/0069165 A1 * | 3/2011 | Zombo et al. .................... 348/82 |
| 2014/0003905 A1 * | 1/2014 | Delvaux ............................ 415/1 |

FOREIGN PATENT DOCUMENTS

CN 101762385 A 6/2010

OTHER PUBLICATIONS

CN Office Action Mailed Oct. 23, 2015.

* cited by examiner

*Primary Examiner* — Ninh H Nguyen
*Assistant Examiner* — Christopher R Legendre
(74) *Attorney, Agent, or Firm* — Fletcher Yoder, P.C.

(57) ABSTRACT

In an embodiment, a system includes a turbomachine having a first turbomachine component including a first mechanoluminescent material. The first turbomachine component is configured to produce a first light emission upon exposure to a mechanical stimulus sufficient to cause mechanoluminescence by the first mechanoluminescent material. The system also includes a turbomachine monitoring system configured to monitor the structural health of the first component based on detection of the first light emission.

18 Claims, 4 Drawing Sheets

TURBOMACHINE MONITORING SYSTEM AND METHOD

STATEMENT REGARDING FEDERALLY SPONSORED RESEARCH AND DEVELOPMENT

This invention was made with United States Government support under Contract No. DE-FC26-05NT42643 between the General Electric Company and the United States Department of Energy. The United States Government has certain rights in the invention.

BACKGROUND OF THE INVENTION

The subject matter disclosed herein relates to turbomachines, and, more particularly, to a monitoring system for monitoring the structural health of turbomachines.

A turbomachine may generally be defined as a machine that is configured to transfer energy between a fluid and a rotor, which can be useful for compressing a fluid (e.g., as in a compressor), or for driving a load connected to the rotor (e.g., as in a turbine engine). Accordingly, turbomachines can be found in a number of different settings, including the aerospace industry (e.g., jet engines), the energy industry (e.g., gas turbine engines, steam and/or hydro turbines in a power plant), and automobiles (e.g., compressors).

To enable the energy transfer noted above, turbomachines will typically include a rotor, which may be a shaft, drum, disk, or wheel, and turbomachine blades attached to the rotor. In situations where energy is transferred from the fluid to the rotor, the fluid, which may be heated and/or pressurized, may act on (e.g., flow over and between) the blades to cause the rotor to rotate. Conversely, in situations where the fluid receives energy from the rotor, the rotor will be rotated, causing the blades to act on the fluid to increase the fluid's kinetic energy (e.g., flow rate) and/or potential energy (e.g., pressure). Because turbomachine components such as these are often exposed to harsh conditions, such as high temperatures and pressures, they may be subject to degradation. For example, the blades of a turbine engine may experience relatively large amounts of pressure and heat as they contact hot combustion gases, and a variety of forces may be placed upon them as they rotate. These conditions can result in deformation, cracking, and ultimate failure of the blades. This degradation can lead to reduced performance and, in some circumstances, downtime of the turbomachine for repairs.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a turbomachine having a first turbomachine component including a first mechanoluminescent material. The first turbomachine component is configured to produce a first light emission upon exposure to a mechanical stimulus sufficient to cause mechanoluminescence by the first mechanoluminescent material. The system also includes a turbomachine monitoring system configured to monitor the structural health of the first component based on detection of the first light emission.

In another embodiment, a system includes a turbomachine monitoring system configured to communicatively couple to a turbomachine. The turbomachine monitoring system includes a photodetector configured to detect a light emission from a turbomachine component having a mechanoluminescent material, and a controller communicatively coupled to the photodetector and configured to measure a parameter relating to the detected light emission. The controller is configured to monitor a structural integrity of the turbomachine based on the measured parameter.

In a further embodiment, a method includes monitoring a hot gas path of a gas turbine engine for mechanoluminescent emissions with a turbomachine monitoring system, detecting a first mechanoluminescent emission using a photodetector of the turbomachine monitoring system, and determining whether the first mechanoluminescent emission is indicative of a mechanical failure or an incipient mechanical failure of a component of the gas turbine engine using a controller of the turbomachine monitoring system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
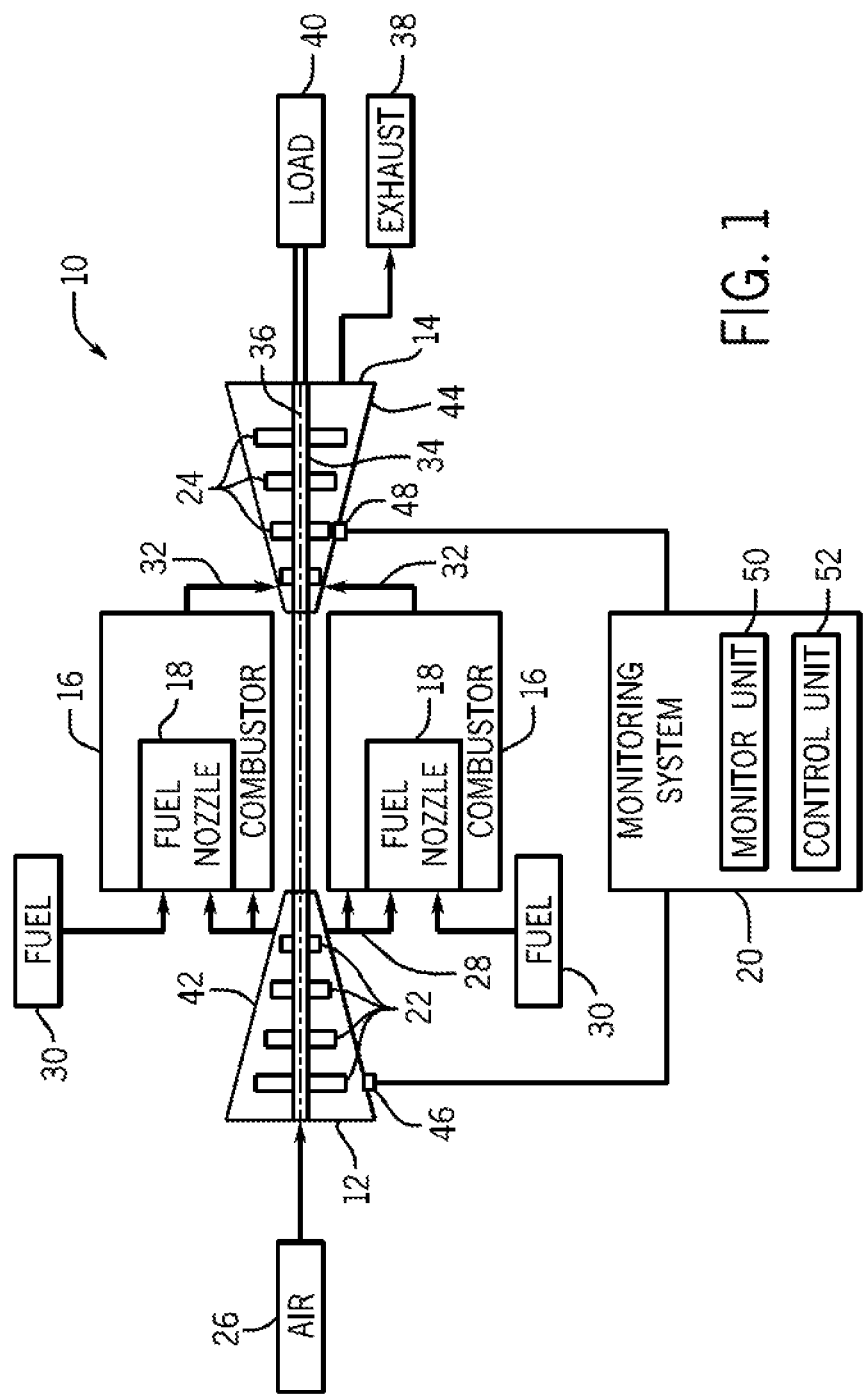
FIG. 1 is a schematic of an embodiment of a gas turbine system and a monitoring system configured to monitor mechanoluminescent emissions from the gas turbine system, in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As noted above, certain components of turbomachines, such as blades, rotors, and the like, may be subject to degradation over time. Because these components are often in motion, operate within a closed environment, and can be disposed within areas of relatively intense conditions, it can be difficult to monitor their structural health without halting the operation of at least a portion of the turbomachine. For example, in a gas turbine engine that uses hot combustion gases to drive a turbine, the turbomachine blades, buckets, shrouds, nozzles, combustion liners, casings, and exhaust ducts, to name some, are all disposed within a closed environment and can experience relatively high levels of heat (e.g., above 1000° F. or above about 538° C.). These conditions may result in turbomachine components being monitored at regular intervals (e.g., by periodic shut-down of the turbomachine) or upon detection of an abnormal operating condition, rather than in real-time.

Therefore, it is now recognized that it may be desirable to monitor the structural health of turbomachine components in substantially real-time in a manner that does not lead to turbomachine down time. Accordingly, embodiments of the present disclosure include a system and method for monitoring the structural health of turbomachine components using properties that are inherent to the components. One such property that is monitored in accordance with the present disclosure is the mechanoluminescence of various turbomachine components. For example, certain turbomachine components may include one or more materials capable of mechanoluminescence as a result of pressure (e.g., piezoluminescence), friction (e.g., triboluminescence), fracture (e.g., fractoluminescence), or any combination thereof. Indeed, as discussed herein, mechanoluminescence of a component is intended to denote luminescence as a result of any mechanical action on the component or material from which the component is formed. By way of example, such components may include matrix composites having two macroscopically different materials combined into a single component, with one material being a filler or reinforcing agent and the other material serving as a principal phase. Such matrix composites may include metal matrix composites (MMCs), ceramic matrix composites (CMCs), and polymeric matrix composites (PMCs). One non-limiting example of a CMC material is a silicon carbide composite having silicon carbide ceramic fibers dispersed within a silicon carbide amorphous matrix.

In accordance with present embodiments, the structural health of any one or a combination of turbomachine components may be monitored according to the mechanoluminescence of those components. For example, the intensity, duration, wavelength, and/or other such parameters of light emitted by a mechanoluminescent turbomachine component may be monitored by any suitable electromagnetic detection method including, but not limited to, cameras, pyrometry, fiber optics, and so on. Indeed, detectors suitable for detecting any one or a combination of regions of the electromagnetic spectrum (e.g., infrared, visible, ultraviolet, X-ray) are presently contemplated for inclusion within the present systems and methods. Accordingly, one structural health monitoring system in accordance with present embodiments may include a photodetector, such as a photodiode array (PDA), photomultiplier tube (PMT), scintillation panel, and/or camera, coupled to a controller having data acquisition and analysis circuitry that is configured to monitor the structural health of components based on mechanoluminescent emissions. The system may also include features configured to optically couple the photodetector to the mechanoluminescent component, such as one or more fiber optic cables (i.e., fiber optic waveguides).

In some embodiments, the structural health monitoring system may be configured to monitor the mechanoluminescence of more than one material. For example, a turbomachine may include different components that are each formed from a different mechanoluminescent material, with each different mechanoluminescent material having a distinct light emission (e.g., wavelength of emitted light). In such a configuration, the structural health monitoring system may be configured to monitor light emissions (e.g., various wavelengths) from any one or a combination of the mechanoluminescent components to determine the structural health of each component.

Again, structural health monitoring systems in accordance with present embodiments may be used to monitor the structural health of any turbomachine component, such as the components of a gas turbine engine, a steam turbine engine, a jet engine, compressors, wind turbine blades, pumps, and so on. Accordingly, while the present approaches toward structural health monitoring are presented in the context of a gas turbine engine, it should be noted that this is merely to facilitate presentation of various embodiments, and that the structural health monitoring systems and methods described herein are applicable to all turbomachines that may utilize mechanoluminescent materials.

With the foregoing in mind, FIG. 1 illustrates a block diagram of one such turbomachine system that may be monitored in accordance with present embodiments. In particular, FIG. 1 illustrates a gas turbine system 10 having a compressor section 12, a turbine section 14, and a plurality of combustors 16 disposed therebetween. In addition, each combustor 16 has at least one associated fuel nozzle 18. The system 10 also includes a monitoring system 20 (e.g., a structural health monitoring system) that is coupled to the compressor and turbine sections 12, 14 for monitoring light emissions from mechanoluminescent components contained within each section. For example, in the illustrated embodiment, the monitoring system 20 is configured to monitor the structural health of at least a set of compressor blades 22 of the compressor section 12 and a set of turbine blades 24 of the turbine section 14. The monitoring system 20 may also be configured to monitor other features of the gas turbine system 10 during its operation, as discussed in further detail below.

During operation of the gas turbine system 10, the compressor section 12 compresses received air 26 to produce compressed air 28. The compressed air 28 is routed to the fuel nozzles 18 and/or combustors 16 where the compressed air 28 is mixed with a fuel 30 (e.g., liquid and/or gaseous fuel). The combustors 16 ignite and combust the resulting fuel-air mixture, and then pass resulting hot pressurized combustion gases 32 (e.g., exhaust) into the turbine section 14.

The hot pressurized combustion gases 32 then pass over and between the turbine blades 24, which causes the turbine blades 24 to transfer energy to a rotor 34 to which the blades 24 are attached. In other words, the action of the hot pressurized combustion gases 32 on the turbine blades 24 causes the blades 24 and the rotor 34 to rotate about a longitudinal axis 36 of the rotor 34. The pressure and temperature of the hot pressurized combustion gases 32 are reduced as they move through the turbine section 12. The resulting gases exit the turbine section 14 as exhaust 38, which may be used to drive other processes such as steam formation for use in a steam turbine (e.g., in a combined cycle system).

Additionally or alternatively, the rotor 34 may be coupled to a load 40, which may be powered via rotation of the rotor 34. By way of example, the load 40 may be any suitable device that may generate power via the rotational output of the turbine system 10, such as a power generation plant or an external mechanical load. For instance, the load 40 may include an electrical generator, a fan of an aircraft engine, and so forth. The rotation of the rotor 36 may also be used to drive compression within the compressor 12.

As illustrated, the compressor 12 and turbine 14, as well as portions of the rotor 34, are housed within a compressor casing 42 and a turbine casing 44, respectively. The compressor and turbine casings 42, 44 may be used as supports for various light detecting elements of the monitoring system 20. Specifically, as illustrated, the compressor and turbine casings 42, 44 are used as supports for a first photodetector 46 and a second photodetector 48, respectively. However, the present embodiments also provide for the first and second photodetectors 46, 48 to be placed in other regions of the gas turbine system 10, such as along any flow region (e.g., along an exhaust duct, flow sleeve, flow liner, combustion liner). Indeed, the photodetectors 46, 48 may be placed at any suitable location for monitoring components of the gas turbine system 10, such as components along a hot gas path of the system 10. Further, it should be noted that in some embodiments, more than one photodetector may be employed for either or both of the compressor and turbine sections 12, 14. For example, one or more photodetectors may be disposed proximate to and may be configured to monitor each turbine and/or compressor stage. In other words, each compressor and/or turbine stage may have one or more photodetectors that are configured to monitor the blades and/or other components of that section. In further embodiments, the number of photodetectors in each of the compressor and/or turbine sections 12, 14 may be more than one, but less than the number of stages. It may be desirable to have a configuration where a photodetector is utilized to monitor each stage so as to facilitate detection and localization of any potential mechanical failure that causes mechanoluminescence.

It should be noted that while FIG. 1 illustrates the system 10 as including two photodetectors, that any number of photodetectors are presently contemplated for use in the monitoring system 20. Indeed, one or more photodetectors may be used for monitoring light emissions from the compressor 12 and/or the turbine 14. The photodetectors may include any detecting element capable of detecting light emissions from a particular component. By way of example, the photodetectors discussed herein may include photodiode arrays (PDAs), photomultipliers, scintillation arrays, pyrometers, cameras, or any combination thereof. Furthermore, each photodetector may be configured to detect one or more parameters related to light emission. For example, each photodetector may be configured to detect a small wavelength range (e.g., using a narrow band filter) or may be configured to detect several wavelengths (e.g., using a broadband filter). In embodiments where the photodetectors are configured to detect certain wavelengths characteristic of a mechanoluminescent emission, the monitoring system 20 may be configured to monitor other parameters related to that particular wavelength. For example, the monitoring system 20 may monitor intensity, duration, periodicity, and other parameters, to determine the likelihood that the detected emission is representative of a potential structural health problem (e.g., fracture, deformation, abrasion). Such detection and monitoring methods are described in further detail below.

The monitoring system 20, as illustrated, includes a monitoring unit 50 configured to perform the monitoring functions described herein. Generally, the monitoring unit 50 may receive signals from the photodetectors 46, 48 that are indicative of detected light emissions from the compressor and turbine sections 12, 14, respectively. Again, the signals may be indicative of one or more parameters of mechanoluminescent emissions, such as wavelengths, intensities, durations, periodicity, and so on. As discussed with respect to FIG. 2, the monitor unit 50 may include memory circuitry such as non-volatile memory, RAM, ROM, EPROM, or the like, that is capable of storing instructions and/or historical data resulting from detected emissions. The monitor unit 50 may determine, based on any one or a combination of parameters related to a particular detected emission, whether the emission is indicative of mechanical failure, incipient mechanical failure, or any such undesirable operational condition.

The monitoring system 20 may also include features for affecting the operation of one or more components of the gas turbine system 10 in response to the light emissions monitored by the monitor unit 50. In the illustrated embodiment, for example, the monitoring system 20 includes a control unit 52 configured to maintain or adjust one or more operational parameters of the gas turbine system 10 in response to a determination by the monitor unit 50 that a particular emission is indicative of an undesirable operational condition. As one example, the control unit 52 may send one or more control signals to the turbine section 14 to cease spinning of the rotor 36 in response to an indication from the monitor unit 50 that one or more turbine blades has broken, is moving through a field of debris (e.g., foreign object debris, native object debris), or is deforming/has deformed. Indeed, certain control signals may cause the gas turbine system 10 to slow or altogether cease operation of the compressor 12, the turbine 14, or a combination thereof.

Figure 2:
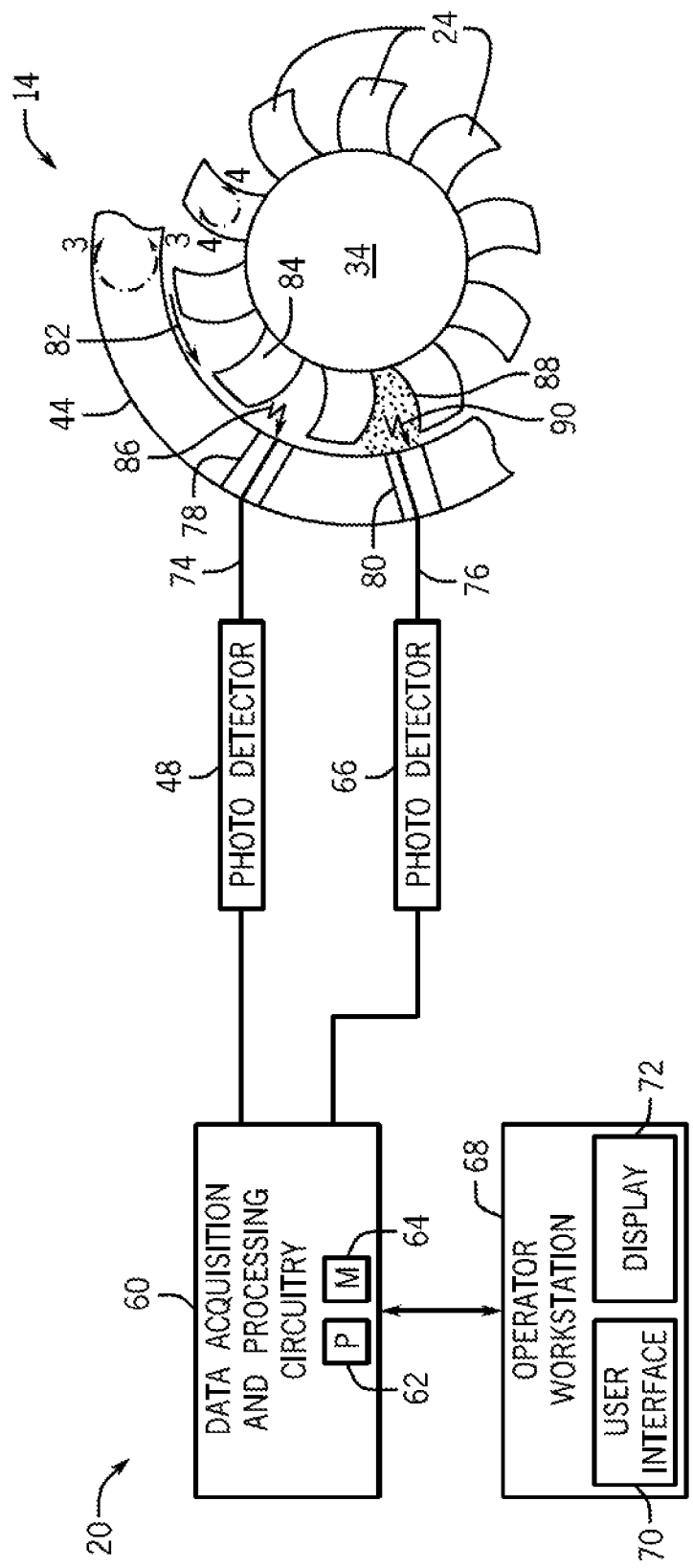
FIG. 2 is a schematic of an embodiment of the monitoring system of FIG. 1 configured to monitor turbomachine blades, in accordance with an aspect of the present disclosure.

It should be noted that the monitoring system 20 may have any configuration that enables the detection of mechanoluminescent emissions by one or more components of the gas turbine system 10. For example, as illustrated in FIG. 2, which is a schematic of the manner by which mechanoluminescent emissions may be detected by the system 20, either or both of the photodetectors 46, 48 may be disposed at a location away from the compressor 12 or turbine 14. Indeed, it may be desirable for the photodetector 48 and its associated circuitry to be disposed at a distance away from the hot gas path formed by the combustor 16, the turbine 14, and the exhaust 38 to protect the photodetector 48 and circuitry from inadvertent heat-related damage. However, while FIG. 2 illustrates one embodiment in which the photodetector 48 is disposed away from the turbine 14, the monitoring system 20 may have a similar or the same configuration in terms of fiber optic cabling, circuitry, displays, operator workstation, and so forth.

In the embodiment illustrated in FIG. 2, the monitoring system 20 includes, among other components, data acquisition and processing circuitry 60 configured to acquire data related to mechanoluminescent emissions and to process the data to determine whether the detected emissions are indicative of a potential mechanical problem. The data acquisition and processing circuitry 60 includes at least one processor 62 and memory circuitry 64 for performing these functions. Generally, the memory circuitry 64 may be any circuitry capable of storing instructions, emission-related data, system-specific information, user preferences, and so on. The instructions stored on the memory circuitry 64 are executable by the at least one processor 62 to perform the monitoring and, in certain configurations, control functions described herein. For example, the memory circuitry 64 may store one or more sets of instructions that, when executed by the at least one processor 62, are configured to monitor the gas turbine system 10 for mechanoluminescent emissions. The instructions may also cause the processor 62 to determine whether the detected mechanoluminescent emissions are indicative of a mechanical failure or an incipient mechanical failure of a component of the gas turbine system 10. The components may include, but are not limited to the turbine blades 24, the turbine casing 44, turbine buckets, turbine shrouds, fuel nozzles, combustion liners, casings, and exhaust ducts.

The data acquisition and processing circuitry 60 (e.g., the processor 62 and memory 64) are communicatively coupled to the second photodetector 48 and, in certain embodiments, at least a third photodetector 66, which are both configured to detect mechanoluminescent emissions from the system 10, as discussed below. The data acquisition and processing circuitry 60 is also communicatively coupled to an operator workstation 68, which may be local or remote to the circuitry 60 and/or the system 10. That is, the operator workstation 68 may be located in the general vicinity of the gas turbine system 10, or may be located remotely in a centralized station, such as an office or the like.

The operator workstation 68 is generally configured to enable an operator (e.g., a technician) to interface with the monitoring system 20 and may, in certain embodiments, enable control/adjustment of one or more operational parameters of the gas turbine system 10. Generally, the operator workstation 68 may be a processor-based computing device having a user interface 70 and a display 72. Accordingly, the operator workstation 68 may be a desktop or laptop computer (e.g., application-specific or general purpose), a tablet computer, a personal data assistant (PDA), a phone, or any other handheld (e.g., wireless) or fixed device providing the functionality of a user interface and/or display. For example, the user interface 70 is configured to enable the user to enter information, such as commands, into the monitoring system 20. Accordingly, the user interface 70 may include, by way of non-limiting example, a mouse, keyboard, keypad, trackball, touchpad, or the like. The display 72 may be any display suitable for providing viewable indications of various detected and/or controllable parameters, such as parameters related to detected mechanoluminescent emissions, operational parameters for the monitoring system 20 and/or the gas turbine system 10, and so on. By way of non-limiting example, the display 72 may include a liquid crystal display (LCD), a light emitting diode (LED) display, various dials, an electronic ink-based screen, or any combination thereof. As discussed below, the display 72 may provide the user with visible indications (e.g., in substantially real-time) related to the intensity, timing, and/or wavelengths of certain emissions detected by the photodetectors 48, 66.

As noted above, the data acquisition and processing circuitry 60 is configured to monitor the emissions detected by the photodetectors 48, 66 to identify the presence of a potential mechanical problem. As illustrated, the second and third photodetectors 48, 66 are each disposed at a distance away from the turbine system 10, and are optically coupled to the system 10 by first and second fiber optic cables 74, 76, respectively. While the illustrated embodiment depicts each photodetector 48, 66 as being coupled to the system 10 via a single fiber optic cable, it should be noted that any suitable number of fiber optic cables may be utilized for this purpose. Accordingly, the second and third photodetectors 48, 66 may each be optically coupled to the system 10 via one, two, three, four, five, or more fiber optic cables. In another embodiment, the second and third photodetectors 48, 66 may share one or more fiber optic cables. Furthermore, the fiber optic cables may include any suitable fiber optic materials including silica, various polymeric species, and the like. Further, the fiber optic cables may be insulated with an insulating layer to provide protection against thermal degradation due to their positioning on or within a hot gas path of the turbine system 10. In certain embodiments, the system 10 may include features for cooling the cables, detectors, and other such equipment using, for example, air (e.g., compressed air), nitrogen (e.g., compressed nitrogen), or similar fluids. For example, in one embodiment, compressed air from the compressor region 12 may be utilized for cooling various features that may be disposed along a hot gas path of the turbine system 10.

In the illustrated embodiment, the first fiber optic cable 74 couples the second photodetector 48 with a first opening 78 in the turbine casing 44. Similarly, the second fiber optic cable 76 couples the third photodetector 66 with a second opening 80 in the turbine casing 44. It should be noted that the first and second openings 78, 80 are depicted as being disposed in different portions of the turbine casing 44 to facilitate discussion of the manner by which various components of the turbine 14 may be monitored. Therefore, the first and second openings 78, 80 may be positioned at any suitable point along the casing 44 (or other section of the gas turbine system 10) that enables the mechanoluminescent emissions of various components to be transmitted along the fiber optic cables 74, 76 and to the photodetectors 46, 48, 66. Indeed, the first and second openings 78, 80 may be separate and distinct, or may be the same. Additionally, as noted above, different stages of the turbine and/or compressor sections may be monitored by separate photodetectors. Indeed, by way of non-limiting example, the first and second openings 78, 80 may be disposed in different circumferential and/or axial portions along the casing 44 to enable the various stages to be separately monitored. Further, while illustrated as being disposed at the same axial position along the casing 42, 44, the openings may not necessarily be at the same axial position along the casing 42, 44 as the turbine blades. Rather, in some embodiments, the openings 78, 80 may be disposed at different axial positions along the casing 42, 44 than the stages.

As noted above, the first and second openings 78, 80 enable various components of the turbine system 10 to be monitored by detecting mechanoluminescent emissions. Specifically, as illustrated, the first and second openings 78, 80 enable light emissions to pass from within the turbine section 14 (e.g., from within an area bound by the turbine casing 44) to the photodetectors 48, 66. Additionally, while the openings 78, 80 are illustrated as being voids within the casing 44, it should be noted that the fiber optic cables 74, 76 may be routed through the casing 44 in a manner that limits the amount of heat and/or pressure lost through the openings 78, 80. For example, the openings 78, 80 may be sized so as to only provide enough clearance to enable the first and second fiber optic cables 74, 76 to pass into the turbine section 14. In other words, the first and second fiber optic cables 74, 76 may be snugly fit into the openings 78, 80.

In further embodiments, the openings 78, 80 may be filled with one or more materials that are substantially similar compared to the material of the casing 44. By way of non-limiting example, the casing 44 may be formed from a ceramic matrix composite (CMC) material, and the openings 78, 80 may be filled with the CMC material, with the matrix of the CMC material, with the filler of the CMC material, or the like. In other embodiments, the openings 78, 80 may be filled with a material having suitable insulative properties so as to limit pressure or heat loss within the casing 44 while enabling the fiber optic cables 74, 76 to receive and transmit light emissions. Thus, the fiber optic cables 74, 76 may span all or a portion of the length of the openings 78, 80 in a manner that enables such transmission.

As generally discussed above, the mechanoluminescent emissions detected by the photodetectors 48, 66 may be a result of one or more mechanoluminescent components of the turbine 14 being subjected to a mechanical stimulus sufficient to cause the component to luminesce. In one embodiment, such luminescence may be caused by molecular-level deformations and/or changes in the material constituting the components. For example, in embodiments where the mechanoluminescent components (e.g., the turbine blades 24) of the turbine 14 include a CMC material, luminescence may be caused by a mechanical stress sufficient to cause molecular bonds in the ceramic filler and/or ceramic matrix to break or deform to an extent such that the resulting molecules are temporarily promoted to an excited state. When the molecules relax to a lower energy state, light is emitted. Accordingly, mechanical stresses sufficient to break or deform molecular bonds in the composite materials may cause the composite materials to luminesce (i.e., emit light). As noted above, the light emission may be a result of mechanical deformation, fracture, friction, or any combination thereof. Accordingly, a light emission may be indicative of a structural abnormality.

The light emitted by each mechanoluminescent component of the turbine 14 may be characteristic of the particular material used to construct that component. Indeed, while it may be desirable to construct the turbomachine components using the same materials to facilitate production, it may also be desirable to construct the components from different mechanoluminescent materials to enable the monitoring system 20 to correlate a particular detected emission to a structural abnormality of a particular turbomachine component. Thus, the turbine blades 24, the shaft 34, and the turbine casing 44 may be formed from the same or different mechanoluminescent components. In the illustrated embodiment, the turbine blades 24 and the turbine casing 44 are formed from different mechanoluminescent materials, which enables the monitoring system 20 to detect potential structural abnormalities in each. Examples of the composite materials that may be used to form the casing 44 and the blades 24 are discussed in further detail below with respect to FIGS. 3 and 4, respectively.

For example, as depicted by an arrow, the turbine blades 24 and the shaft 34 may rotate in a rotational direction 82. As noted above, the turbine blades 24 may experience a variety of forces that can potentially cause the blades 24 to deform, crack, or altogether break. Accordingly, as depicted, upon sufficient exposure to a particular mechanical stress, a first turbine blade 84 produces a first light emission 86, depicted as an arrow. The first light emission 86 may be transmitted by the first and/or second fiber optic cables 74, 76 and to the second and/or third photodetectors 48, 66. The second and/or third photodetectors 48, 66, may then produce a signal indicative of the wavelength of the first light emission 86, an intensity of the first light emission 86, a duration of the first light emission 86, a periodicity of the first light emission 86, or any combination thereof. The data acquisition and analysis circuitry 60 may then receive and process these signals to determine whether the first light emission 86 is indicative of a structural abnormality in the first turbine blade 84.

The first light emission 86, as noted above, may be transmitted to and detected by either of the second and/or third photodetectors 48, 66. However, it should be noted that the components of the turbine system 10, in particular those components disposed along hot gas paths, may have relatively high temperatures and, therefore, relatively high irradiance in wavelengths that are above visible wavelengths (e.g., IR). Thus, the turbine 14 may have a relatively high amount of background emissions in addition to the mechanoluminescent emissions. Accordingly, the monitoring system 20 may include one or more optical filters that are capable of blocking certain portions of the electromagnetic spectrum from being transmitted along the fiber optic cables 74, 76 and/or detected by the photodetectors 48, 66. The optical filters, by way of example, may be placed along the fiber optic cables 74, 76 between the photodetectors 48, 66 and the area defined by the casing 44, or at the termini of the fiber optic cables 74, 76, or a combination thereof. Accordingly, the optical filters may enable the data acquisition and analysis circuitry 60 to monitor selected wavelengths of light. This may desirably enable prolonged life of the photodetectors 48, 66 as well as increased sensitivity to mechanoluminescent emissions. In addition, separate optical filters selected for each of the first and second fiber optic cables 74, 76 may enable each of the photodetectors 48, 66 to be a dedicated channel for a particular emission wavelength such that the first fiber optic cable 74 and its associated optical filter create a first channel dedicated for a first light emission, and the second fiber optic cable 76 and its associated optical filter create a second channel dedicated for a second light emission. Such a configuration may be desirable to facilitate the detection, differentiation, and processing of separate emissions, which are discussed in detail below. Indeed, in certain embodiments, different wavelengths may be monitored by each of the photodetectors 48, 66, the wavelengths being indicative of emissions from different sources.

The turbine casing 44, as noted above, may be formed from a second mechanoluminescent material. The turbine casing 44 may not necessarily be subject to the same forces as the turbine blades 24. However, the casing 44 may nevertheless experience mechanical stresses produced by thermal expansion/contraction resulting from exposure to hot combustion gases, as well as abrasion in situations where the turbine blades 24 contact the casing 44 (which, to facilitate discussion, may include turbine shrouds, buckets, etc.). In the illustrated embodiment, the turbine blades 24 or another object has contacted the casing 44, thereby producing a field of debris 88. The field of debris 88 may include the casing material, the turbine blade material, or a combination thereof. For simplicity and to facilitate discussion, the field of debris 88 is discussed in the context of including only the casing material, though it should be appreciated that the field of debris may also include other materials that may be foreign or local to the turbine 14.

As the blades 24 rotate, they pass through the field of debris 88, causing abrasion both on the blades 24 and on the particles constituting the field of debris 88. This may result in the first light emission 86, or in a second light emission 90, depicted as an arrow, by the casing material. Indeed, the event that caused the field of debris 88 to form, i.e., the abrasion of the blades 24 against the casing 44, may also result in the second light emission 90.

Because the casing 44 is formed from a different mechanoluminescent material, the second light emission 90 may be different than the first light emission 86. For example, the wavelength of the second light emission 90 may be distinct compared to the first light emission 86. This wavelength difference may enable the data acquisition and processing circuitry 60 to correlate first detected wavelengths characteristic of the first light emission 86 to the first turbine blade 84 and to correlate second detected wavelengths characteristic of the second light emission 90 to the turbine casing 44. The monitoring system 20 may provide a user-perceivable indication, such as a visual representation on the display 72, that the turbine blades 24 and/or the casing 44 are potentially damaged or may benefit from servicing.

The materials used to form the casing 44 and the turbine blades 24 may include, as noted above, a composite material including a filler (e.g., particles, fibers, rods, rings, discs, spheres, nanodispersoids) disposed within a matrix. The filler, the matrix, or both, may be a mechanoluminescent material including silicon carbide, inorganic oxides (e.g., silica, alumina, titania), inorganic oxide derivatives (e.g., $SrAl_2O_4$), doped inorganic oxides (e.g., Pr-doped $BaTiO_3$, Eu- or Dy-doped $SrAl_2O_3$, Eu-doped $SrMgAl_6O_{11}$, Ce-doped $Ca_2Al_2SiO_7$, Ti-doped $ZrO_2$), Mn-doped ZnS, ZnMnTe, or any mechanoluminescent material having desired physical properties. Accordingly, the wavelengths that may be monitored in accordance with present embodiments by the monitoring system 20 of FIGS. 1 and 2 may correspond to the particular wavelength(s) emitted by any one or a combination of these materials during mechanoluminescence. By way of example, silicon carbide emits a narrow band of wavelengths at approximately 580 nm. Indeed, in one embodiment, the mechanoluminescent material may be silicon carbide, which may be mechanoluminescent in certain configurations (e.g., in a CMC composite) and which also has desirable thermal stability and mechanical strength for use in gas turbines. The casing 44 and the turbine blades 24, in some embodiments, may be made by laminating a plurality of plies together, each of the plurality of plies having a ceramic filler disposed within a matrix (e.g., a metallic, polymeric, or ceramic matrix). Expanded schematic views of the casing 44 and the turbine blades 24 are provided in FIGS. 3 and 4, respectively.

Figure 3:
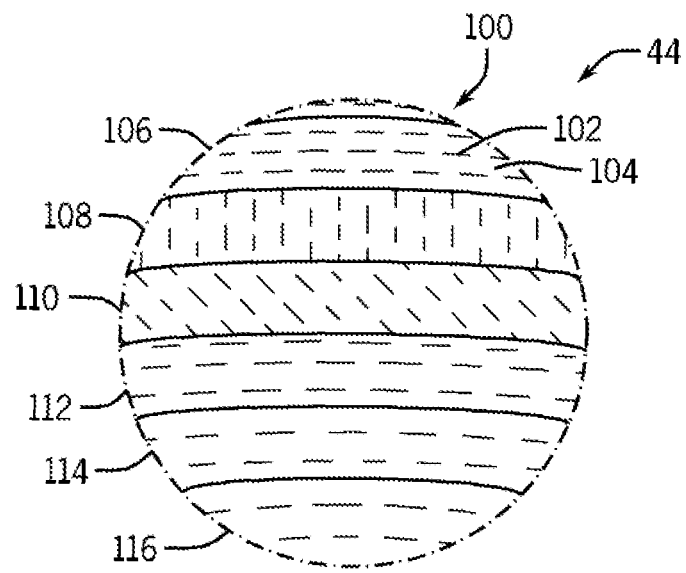
FIG. 3 is an expanded view of an embodiment of a composite material forming the turbine casing of FIG. 2, in accordance with an aspect of the present disclosure.
Figure 4:
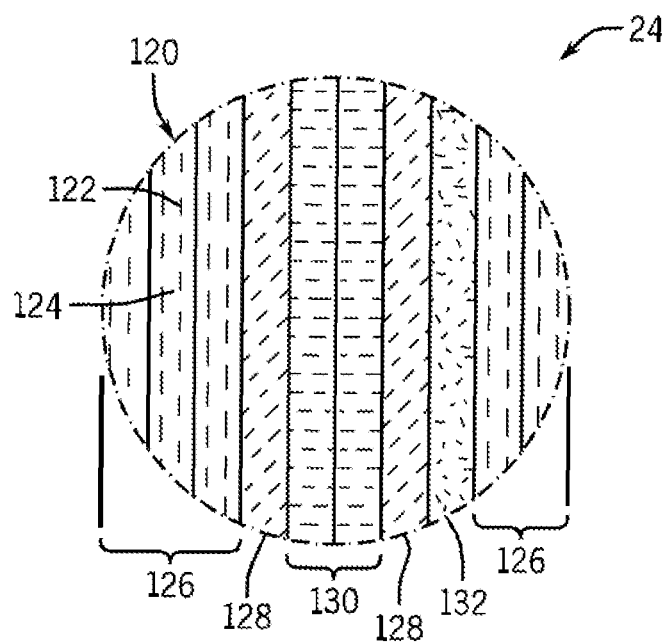
FIG. 4 is an expanded view of an embodiment of a composite material forming the turbomachine blades of FIG. 2, in accordance with an aspect of the present disclosure.

In particular, FIG. 3 depicts an expanded schematic view of an embodiment of the casing 44 taken within line 3-3 of FIG. 2. The casing 44, as illustrated, is formed by a plurality of plies 100 that are laminated against one another. It should be noted that the plies 100 may be curved so as to produce the curvature of the casing 44. However, configurations in which the plies 100 are substantially straight are also presently contemplated. Each of the plies 100 includes a ceramic filler 102, illustrated as ceramic fibers, disposed within a ceramic matrix 104. In one embodiment, the ceramic filler 102 and matrix 104 are silicon carbide. As illustrated, the orientation of the filler 102 within the matrix 104 may be the same across different plies 100, or may be different. For example, the expanded view of the casing 44 illustrates a first ply 106 having its respective fillers in a first orientation. A second ply 108, as illustrated, has its respective fillers 102 in a second orientation that is substantially perpendicular with respect to the fillers 102 in the first ply 106. Indeed, the plies 100 may have any relative orientation of the fillers 102. For example, a third ply 110 has its respective fillers 110 at an angle compared to the first ply 106. Fourth, fifth, and sixth plies 112, 114, and 116 are all oriented substantially parallel with respect to the first ply 106. Turbomachine components in accordance with present embodiments may have any one or a combination of these relative orientations.

The ceramic fillers 102, the ceramic matrix 104, or a combination thereof, may emit light when mechanically deformed. The ceramic matrix 104 may be relatively amorphous (e.g., unordered), and may enable some small amount of deformation to increase the resilience of the ceramic composite. However, the ceramic fillers 102 are, in the illustrated embodiment, ordered fibers that are not intended deform to an appreciable extent. Accordingly, if deformed (e.g., bent, cracked, broken), the fillers 102 may produce a relatively strong emission compared to the emission that may be produced by the typical deformation experienced by the matrix 104 during the normal course of operation of the turbine system 10. Therefore, in embodiments where a "spike," or relatively strong emission is detected, this may indicate that the fillers 102 (e.g., fibers, particles) may have deformed as a result of severe bending, cracking, breaking, or relatively large amounts of abrasion.

As noted above, FIG. 4 illustrates an expanded view of one of the turbine blades 24 taken within line 4-4 of FIG. 2. In particular, the turbine blade 24 includes a plurality of plies 120, each having a filler 122 disposed within a matrix 124. In addition, while the plies 120 are illustrated as being substantially straight, in certain embodiments the plies 120 may be bent (e.g., as illustrated in FIG. 3), twisted, or any combination thereof. In other words, some plies 120 may be straight while others may be bent and/or twisted. In a similar manner as described above with respect to FIG. 3, the filler 122 may have a variety of orientations within the matrix 124. Indeed, as illustrated, the turbine blade 24 includes seventh plies 126 each having fillers 122 that are oriented substantially parallel with respect to one another and with respect to a plane defined by the plies 126, the plane being generally parallel with the longitudinal axis of each blade. The turbine blade 24 also includes eighth plies 128 having fillers 122 that are angled with respect to the plane defined by the plies 128, and ninth plies 130 having fillers 122 that are substantially perpendicular with respect to the plane defined by the plies 130. It should be noted that the fillers 122 within a given ply 120 need not have the same orientation. Accordingly, as illustrated, the turbine blade 24 also includes a tenth ply 132 having a substantially random orientation of its fillers 122.

The composite materials described herein may have any of the ply configurations described above with respect to FIGS. 3 and 4. Indeed, certain orientations of the fillers within each ply may be desirable to facilitate detection of particular types of mechanical stresses. By way of non-limiting example, the turbine blade 24 may include or consist of plies having fillers with an orientation that enables mechanoluminescent emission upon deformation in certain directions, such as deformation resulting from centrifugal forces, torque, and so on. One such configuration may be as illustrated in the seventh plies 126, which enables a maximum number of fillers to be deformed as a result of shear stresses placed on the plies. Indeed, in a general sense, the greater the number of bonds that are deformed/broken in the fillers, plies, matrix, etc., the greater the mechanoluminescent emission.

Similarly, the casing 44 may have an orientation of its fillers disposed in such a way so as to facilitate mechanoluminescence upon abrasion. For example, the orientation depicted by the second ply 108 in FIG. 3 may facilitate such emissions, as abrasion is likely to occur by the turbine blades 24 in a direction substantially orthogonal to the orientation of the fillers in the second ply 108. In other words, the orthogonal orientation may facilitate deformation and/or breaking of the fillers, which may enhance emission intensity.

Figure 5:
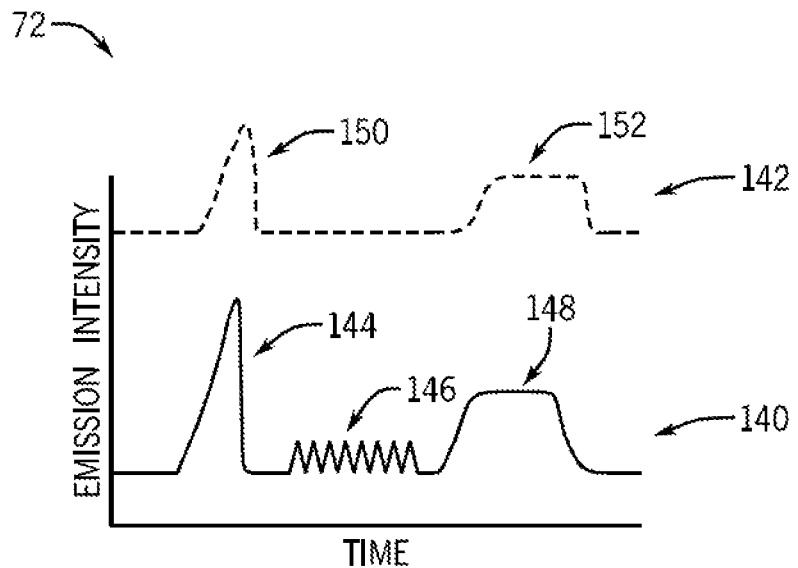
FIG. 5 is a schematic of an embodiment of a display of FIG. 2 displaying emission spectra generated by the monitoring system of FIG. 2, in accordance with an aspect of the present disclosure.

As noted above, the monitoring system 20 may monitor the emissions from one or more mechanoluminescent components of the gas turbine system 10, and may display (on the display 72 of FIG. 2) a variety of emission spectra that can be correlated to the components. An example of the display 72 is illustrated in FIG. 5. In the illustrated embodiment, the display 72 includes a first plot 140 of emission intensity versus time for a first monitored wavelength (e.g., corresponding to the first turbine blade 84 of FIG. 2) and a second plot 142 of emission intensity versus time for a second monitored wavelength (e.g., corresponding to the turbine casing 44 of FIG. 2).

The first and second plots 140, 142, as illustrated, may, but do not necessarily correspond to the same points in time. That is, while the first and second plots 140, 142 are discussed as potentially occurring at substantially the same time, in certain embodiments, the points in time in which the emissions are detected to produce the first and second plots 140, 142 may be different.

Further, in certain embodiments, the display 72 may only display one monitored wavelength (or monitored band of wavelengths) at a time, or may provide a display of several monitored wavelengths (or monitored bands). Indeed, each plot may correspond to a particular data channel. For example, the signal produced by each photodetector of the monitoring system 20 may constitute a separate channel. In this way, the display 72 may provide an indication of the same monitored wavelength or wavelength band across several photodetectors.

As illustrated, the first plot 140 includes several peaks corresponding to emissions detected by one of more of the photodetectors of the monitoring system 20. The peaks include a first peak 144 having a relatively higher intensity when compared with the remainder of the plot 140. Such a peak may indicate, for example, a relatively intense and short-lived emission caused by fracture and/or breakage of one or more of the turbine blades 24. The first plot 140 also includes a series of relatively low intensity peaks 146, which may indicate slight deformation in one or more of the turbine blades 24. Indeed, the repeating nature of the peaks 146 may indicate that the emission has resulted from a rotating turbine blade 24 that is deforming. Further, the first plot 140 also includes a second peak 148, which is relatively intense and long-lived. Such a peak may indicate that the blades 24 are experiencing a substantially constant abrasion as they are spinning, such as due to debris (e.g., field debris 88 of FIG. 2).

The second plot 142, which is illustrated in a separate section of the display 72 from the first plot 140 to facilitate presentation, includes a third peak 150 that is relatively intense and short-lived. In a similar manner to the first peak 144, such a peak may be indicative of a fracture in the casing 44, such as a fracture caused by the striking of a turbine blade 24 against a surface of the casing 44. The second plot 142 also includes a fourth peak 152, which is relatively intense and long-lived. Indeed, the fourth peak 152 may be a result of the same or a similar issue as the second peak 148 (i.e., blades 24 spinning through a field of debris). For example, the second peak 148 may result from mechanoluminescent emissions from the blades 24, while the fourth peak 152 may result from mechanoluminescent emissions from the material constituting the field of debris.

Figure 6:
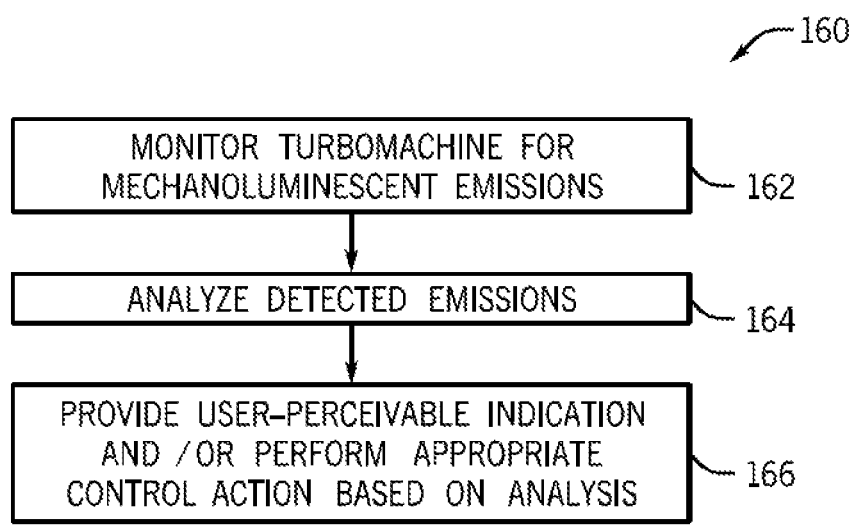
FIG. 6 is a process flow diagram illustrating an embodiment of a method for monitoring mechanoluminescent emissions from a turbomachine and controlling an operational parameter based on the monitored emissions, in accordance with an aspect of the present disclosure.

It should be noted that the nature of the detected emissions may enable the monitoring system 20 to determine whether the emissions are indicative of ultimate mechanical failure (i.e., breakage), incipient failure (e.g., deformation likely to result in ultimate failure), heavy wear, impact, or the like, and to take appropriate actions based on the determination. As discussed with respect to FIG. 2, the monitoring system 20 may include data acquisition and control circuitry configured to perform such actions. FIG. 6 illustrates a process flow diagram of an embodiment of a method 160 for monitoring mechanoluminescent emissions, determining the nature of the mechanoluminescent emission (i.e., whether the emission is indicative of a particular type of mechanical deformation or failure), and performing an appropriate control action based on the determination.

The method 160 may be performed by the monitoring system 20, with certain of the monitoring and analysis steps being performed by the processor 62 based on instructions stored in the memory 64 which, as noted above, may be one or more non-transitory machine-readable media collectively storing the instructions that are executable by the processor 62. Accordingly, the acts of the method 160 may be totally or partially automated.

In the illustrated embodiment, the method 160 includes monitoring (block 162) a turbomachine (e.g., the gas turbine system 10) for mechanoluminescent emissions. For example, the monitoring system 20 may monitor signals produced by any one or a combination of the photodetectors 46, 48, 66 (FIGS. 1 and 2) as a result of detecting light produced by mechanoluminescent materials. In embodiments where components of the gas turbine machine that are monitored are formed from silicon carbide CMC materials (e.g., similar to the materials illustrated in FIGS. 3 and 4), for example, the monitoring system 20 may monitor emissions centered approximately about 580 nm. Indeed, in a general sense, the monitoring system 20 may monitor emissions having wavelengths in the visible region, such as between approximately 400 and 750 nm, although other wavelengths outside of this range (e.g., below 400 nm) are also presently contemplated. Again, wavelengths corresponding to the infrared region of the electromagnetic spectrum may be filtered, as they may correspond to background emissions due to heating of hot gas path components. As also noted above, the monitoring system 20 may monitor the mechanoluminescent emissions via a camera, pyrometer, diode arrays, scintillation panels, photomultipliers, or any combination thereof.

The method 160 also includes analyzing (block 164) the emissions detected in accordance with block 162. For example, the monitoring system 20 may analyze any parameter relating to the detected emissions, such as the intensity of the emissions, the duration of the emissions, a periodicity or frequency of the emissions, wavelengths of the emissions, timing of the emissions, relative intensities between various wavelengths, or any combination thereof.

For example, highly intense, short-lived emissions may represent ultimate failure, while relatively intense, short-lived emissions such as represented by peaks 144, 150 of FIG. 5 may represent impact, fracture, ultimate failure, or any combination thereof. Broad peaks, such as peaks 148 and 152 of FIG. 5 may represent debris fields, and repeating peaks (e.g., peaks 146 of FIG. 5) may represent a repeating emission by one or more components as a result of regularly applied mechanical stresses, such as those due to shear resulting from rotation, torque, and other centrifugal forces. In certain embodiments, the analyzed parameters may indicate whether the emissions are a result of triboluminescence, fractoluminescence, piezoluminescence, or the like. In performing the acts represented by block 164, the monitoring system 20 may also determine whether the emissions are from a first light emission of a first component having a first mechanoluminescent material or from a second light emission of a second component having a second mechanoluminescent material. Indeed, in further embodiments, the monitoring system, based on the analyzed parameters of the emission, may determine whether the emission is from the first or the second component, even in situations where the components are formed from substantially the same material. In such embodiments, the detected emission may be correlated to the particular component based on one or more characteristics of the emission resulting from differences in the orientation or configuration of the composite constituting the different components.

The method 160 also includes providing a user-perceivable indication as a result of the analysis, or performing an appropriate control action based on the analysis (block 166). For example, in embodiments where the analysis results in a determination by the monitoring system 20 that the emission is a result of mechanical failure or incipient mechanical failure, the monitoring system 20 may provide a visual or audible alarm for a technician indicating that service to the turbomachine may be needed. The monitoring system 20 may also provide statistics, such as historical data relating to various structural components of the gas turbine system 10. For example, the monitoring system 20 may provide a visual indication to a user that represents estimated wear of certain components, the likelihood that certain components will fail, or similar indications.

In such embodiments, the monitoring system 20 may, additionally or alternatively, perform a suitable control action. For example, the monitoring system 20 may stop, start, or slow the operation of all or a portion of the gas turbine system 10. Indeed, in a general sense, the monitoring system 20 may perform control actions that may mitigate further damage to the gas turbine system as a result of the detected failure until suitable maintenance is performed. By way of non-limiting example, the monitoring system 20 may adjust the clearance of the turbine blades 24 relative to the casing 44 (e.g., relative to shrouds of the casing) to correct for any abrasion of the blades 44 against the casing or striking of the blades 24 against the casing 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbomachine comprising a first turbomachine component having a first mechanoluminescent material, wherein the first turbomachine component produces a first light emission upon exposure to a mechanical stimulus sufficient to cause mechanoluminescence by the first mechanoluminescent material; and
   a turbomachine monitoring system comprising a controller, wherein the controller comprises data acquisition and processing circuitry configured to monitor the structural health of the first turbomachine component based on an analysis of the first light emission by correlating the first light emission to the mechanoluminescence of the first turbomachine component, and to provide a user-perceivable indication of the structural health of the first turbomachine component, adjust an operating speed of the turbomachine in response to the first light emission, or a combination thereof, based on the analysis.

2. The system of claim 1, wherein the turbomachine monitoring system comprises a photodetector that detects the first light emission and produces a first electrical signal representative of the first light emission, and wherein the controller is configured to analyze the first electrical signal to measure a parameter relating to the first light emission.

3. The system of claim 2, wherein the controller is configured to measure the parameter to determine whether the first light emission is indicative of mechanical failure or an incipient mechanical failure of the first turbomachine component.

4. The system of claim 2, wherein the parameter comprises an intensity of the detected first light emission, a relative intensity of one or more wavelengths within the first light emission, a timing of the first light emission, a wavelength of the first light emission, a frequency of the first light emission, or any combination thereof.

5. The system of claim 2, wherein the turbomachine monitoring system comprises a fiber optic cable optically coupling the first turbomachine component with the photodetector.

6. The system of claim 1, wherein the turbomachine monitoring system comprises a camera configured to capture at least a portion of the first light emission.

7. The system of claim 1, wherein the turbomachine comprises a turbine, a compressor, or a pump, and the first turbomachine component comprises at least a portion of a fuel nozzle, a combustor, an exhaust section, a rotating blade, or any combination thereof.

8. The system of claim 1, wherein the first turbomachine component comprises a plurality of laminated plies each formed from a ceramic matrix composite (CMC).

9. The system of claim 1, wherein the turbomachine comprises a second turbomachine component having a second mechanoluminescent material, and the second turbomachine component produces a second light emission upon exposure to a second mechanical stimulus sufficient to cause the emission by the second mechanoluminescent material, and wherein the data acquisition and processing circuitry is configured to monitor the structural health of the second component based on an additional analysis of the second light emission by correlating the second light emission to mechanoluminescence of the second turbomachine component, and wherein the data acquisition and processing circuitry is configured to provide a user-perceivable indication of the structural health of the second turbomachine component, adjust an operating speed of the turbomachine in response to the second light emission, or a combination thereof, based on the additional analysis.

10. The system of claim 9, wherein the first light emission and the second light emission each comprise one or more characteristic emission parameters, and the turbomachine monitoring system is configured to differentiate between the first and second light emissions to determine whether a mechanical failure or incipient mechanical failure of the first turbomachine component and the second turbomachine component is indicated.

11. The system of claim 1, wherein the mechanical stimulus comprises at least one of pressure on the first mechanoluminescent material, abrasion on the first mechanoluminescent material, vibratory and steady loads on the first mechanoluminescent material, or foreign object damage on the first mechanoluminescent material.

12. A system, comprising:
    a turbomachine monitoring system communicatively coupled to a turbomachine, comprising:
       a photodetector that detects a light emission from a turbomachine component having a mechanoluminescent material; and
       a controller communicatively coupled to the photodetector and comprising data acquisition and processing circuitry configured to measure a parameter relating to the light emission by correlating the light emission to mechanoluminescence of the turbomachine component, and wherein the data acquisition and processing circuitry is configured to monitor a structural health of the turbomachine based on the parameter and to provide a user-perceivable indication of the structural health of the turbomachine component, adjust an operating speed of the turbomachine in response to the light emission, or a combination thereof.

13. The system of claim 12, wherein the controller is configured to determine whether the light emission is a result of piezoluminescence, fractoluminescence, or triboluminescence, or a combination thereof, based on the parameter or another measured parameter relating to the light emission.

14. The system of claim 12, wherein the turbomachine monitoring system comprises a fiber optic waveguide configured to be placed within or proximate a hot gas path of the turbomachine to enable the fiber optic waveguide to transmit at least a portion of the light emission from the turbomachine component to the photodetector.

15. The system of claim 12, comprising the turbomachine, wherein the turbomachine comprises a gas turbine engine having a hot gas path comprising:
   a combustor that combusts a fuel in the presence of compressed air to produce hot combustion gases;
   a turbine that receives the hot combustion gases from the combustor and causes an interaction between the hot combustion gases and a turbine blade to produce mechanical energy and exhaust gases; and
   an exhaust that outputs the exhaust gases from the gas turbine engine; and
   wherein the turbomachine component comprises a combustion liner, an exhaust duct, a turbine shroud, the turbine blade, or a turbine wheel.

16. The system of claim 15, wherein the turbomachine component comprises a plurality of laminated plies each formed from a ceramic matrix composite (CMC), and at least one of the plurality of laminated plies is formed from a silicon carbide CMC.

17. The system of claim 16, wherein the silicon carbide CMC is a first mechanoluminescent material that produces a first characteristic mechanoluminescent emission, and at least one other of the plurality of laminated plies comprises a second mechanoluminescent material that produces a second characteristic mechanoluminescent emission, and the controller is configured to determine whether the detected light emission is the first characteristic mechanoluminescent emission, the second characteristic mechanoluminescent emission, or both, to determine the structural health of the turbomachine component.

18. A method, comprising:
   monitoring a hot gas path of a gas turbine engine for mechanoluminescent emissions with a turbomachine monitoring system;
   detecting a first mechanoluminescent emission using a photodetector of the turbomachine monitoring system; and
   determining whether the first mechanoluminescent emission is indicative of a mechanical failure or an incipient mechanical failure of a component of the gas turbine engine using a controller of the turbomachine monitoring system.

* * * * *